(No Model.)

G. M. PETERS.
CARTRIDGE.

No. 380,689. Patented Apr. 10, 1888.

ATTEST.
J. Henry Kaiser.
Victor J. Evans.

INVENTOR.
G. Moore Peters.
By J. H. MacDonald.
Atty.

UNITED STATES PATENT OFFICE.

G. MOORE PETERS, OF XENIA, OHIO.

CARTRIDGE.

SPECIFICATION forming part of Letters Patent No. 380,689, dated April 10, 1888.

Application filed February 6, 1888. Serial No. 263,075. (No model.)

*To all whom it may concern:*

Be it known that I, G. MOORE PETERS, a citizen of the United States, residing at Xenia, in the county of Greene and State of Ohio, have invented certain new and useful Improvements in Cartridge-Shells; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cartridges, and is an improvement on the one granted to me in Letters Patent of the United States No. 299,162, May 27, 1884.

In the patent referred to the fastening for the upper wad consists of inwardly-projecting holding-pieces made by indenting and cutting the sides or wall of the shell and forcing the holding-piece inward in such manner that their lower edges press against the wad, the holding-pieces being of a substantially triangular or pyramidal form when pressed into the interior of the shell. The indenting-points in shoving the indentations or holding-pieces inward almost invariably so cut, tear, or crush them upward along the acute angle that they become greatly weakened. As a result, they do not hold the wad in with sufficient firmness. In firing, the indentations are torn out and the gas escapes into the gun-chamber, producing fouling, which soon causes leading at the shoulder, so interfering with the passage of the shot, good pattern, and penetration; moreover, the shell being torn at the end, it cannot be reloaded, as is often desirable. This has led me to change the form of the indentation from a triangular and pyramidal shape to the oval and cone shape, while still preserving the feature of cutting the base clean away from the wall of the shell and shoving it in over the wad. This will be hereinafter more fully explained, and illustrated in the accompanying drawings, in which—

Figure 1:
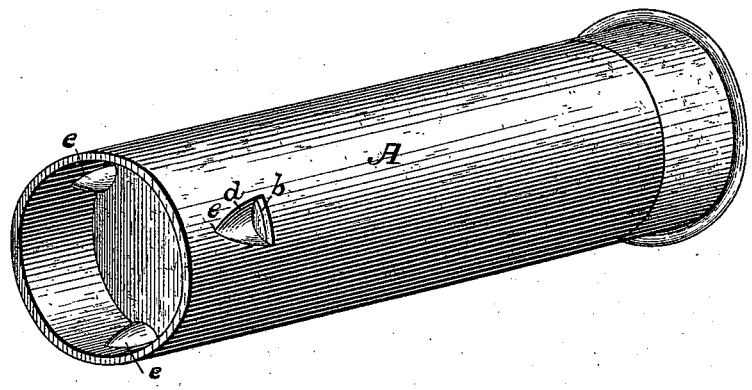
Figure 2:
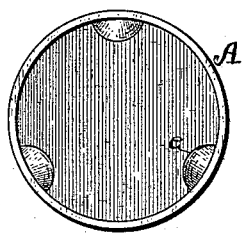
Figure 3:
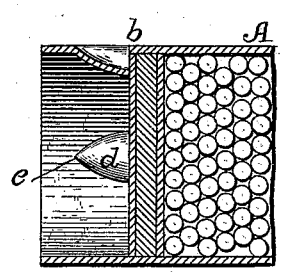

Figure 1 is a perspective view of the shell, showing the indentations forced over the wad; Fig. 2, an end view, and Fig. 3 a section of same.

As here shown, the base *b* of the holding-pieces *d* is cut away in the same manner from the wall of the shell A as in my former patent before referred to, but the indentations are forced inward, so as to leave the interior faces convex instead of acute, and instead of having the faces meet, forming an acute angle, the indentations are cone-shaped, the apex *e* being rounded, and the bases being arc-shaped, as shown in the drawings. These indentations are made at the moment when the greatest pressure is being exerted on the load, the rammer being withdrawn without altering the shape, whereby a firm fastening is secured and the load, of whatever size, is held in the same compact form in which it is left by the machine in filling. This makes a firm and enduring fastening, it being plainly impossible for the indentations to withdraw of their own accord or their hold to be loosendd by dampness of the atmosphere. The base of the indentations not forming a complete circle of resistance, and being easily pressed back into the opening from which they were cut by the bulging of the wad, there is presented the least possible obstruction to the load when discharged. This tends to prevent recoil of the gun and scattering of the shot and increases the penetration. The end of the shell not being turned in or crushed, the chamber of the gun is completely filled and the liability of fouling at that point obviated. The shell can be perfectly reloaded, as the places where the indentations are pressed in are again pressed out into their proper position by the action of the load.

Having thus described my invention, what I claim is—

1. A cartridge the sides of which are cut and indented to leave inwardly-projecting holding-pieces, the said pieces being indented in such manner that when pressed inward their inner faces are convex, the shell being entirely cut away at the bottom of said holding-pieces, which are forced inward, so that their edges press against the wad or ball.

2. A cartridge the sides of which are indented and cut to leave inwardly-projecting holding-pieces, each separate holding-piece having an arc-shaped base, as and for the purpose set forth.

In testimony whereof I affix my signature in presence of two witnesses.

G. MOORE PETERS.

Witnesses:
W. K. McKIBBEN,
W. K. MOOREHEAD.